H. CORRALL.
POWER TRANSMITTER.
APPLICATION FILED MAY 6, 1915.
1,211,293.
Patented Jan. 2, 1917.
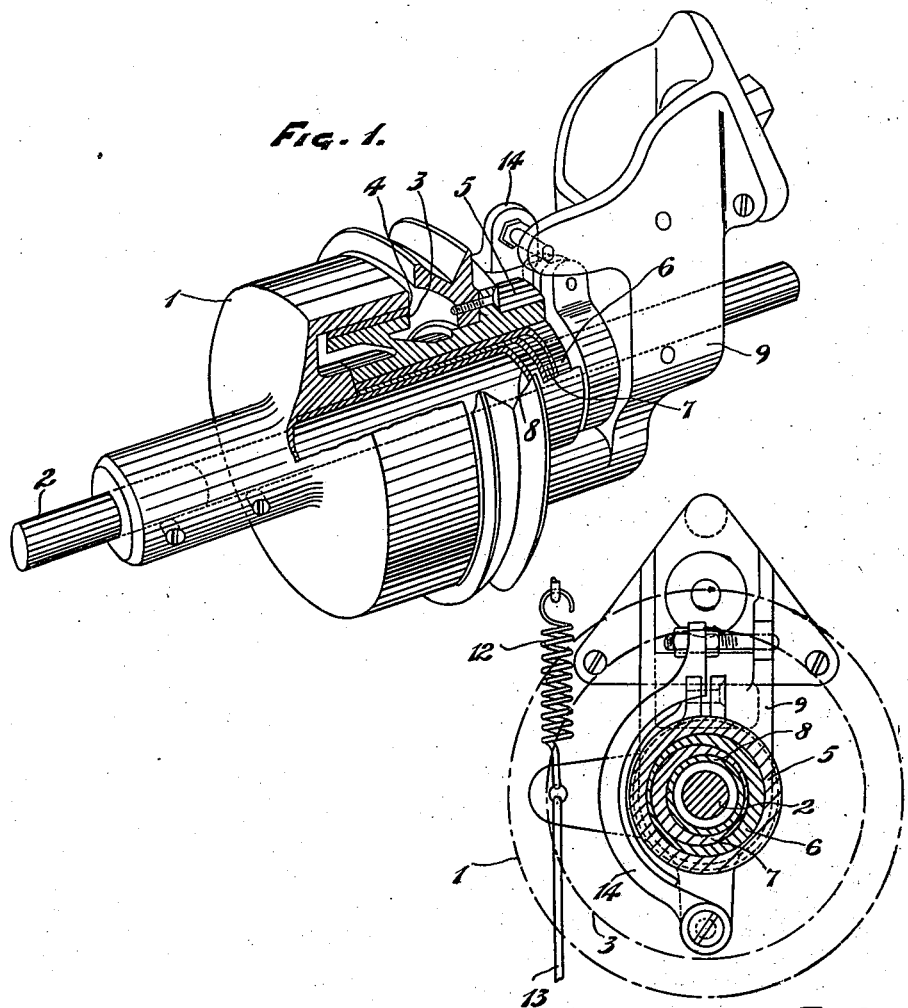
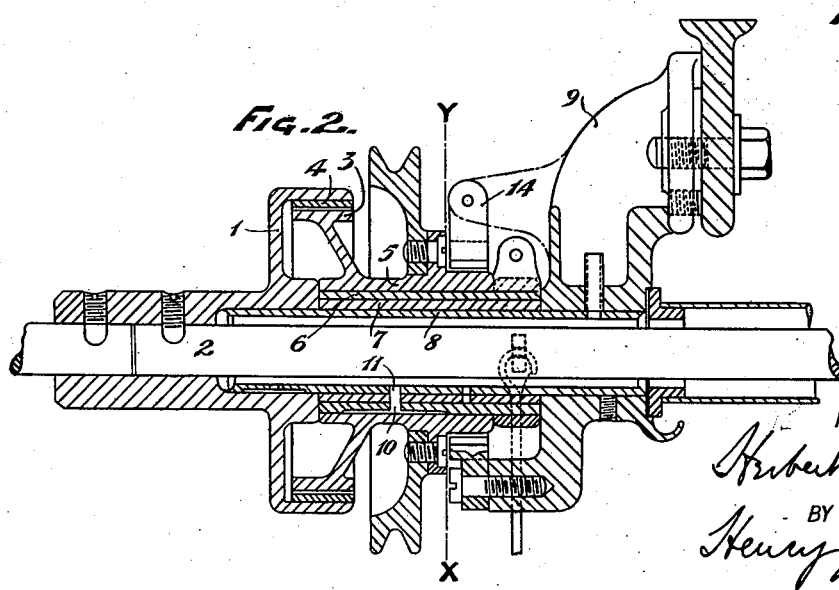
INVENTOR
Herbert Corrall
BY
Henry J. Miller
ATTORNEY

UNITED STATES PATENT OFFICE.

HERBERT CORRALL, OF HELENSBURGH, SCOTLAND, ASSIGNOR TO THE SINGER MANUFACTURING COMPANY, A CORPORATION OF NEW JERSEY.

POWER-TRANSMITTER.

1,211,293.

Specification of Letters Patent.

Patented Jan. 2, 1917.

Application filed May 6, 1915. Serial No. 26,249.

*To all whom it may concern:*

Be it known that I, HERBERT CORRALL, a subject of the King of the United Kingdom of Great Britain and Ireland, and residing at Helensburgh, Dumbartonshire, Scotland, have invented a certain new and useful Improvement in Power-Transmitters, of which the following is a specification.

This invention relates to a power transmitter adapted *inter alia* for use in a power bench carrying a number of sewing machines driven from a rotating shaft.

The primary object of the invention is to provide a simple construction comprising a minimum number of parts of which the driving and driven members are adapted to be brought into engagement by lateral displacement of the driven member, the axis of which is rigidly maintained in spaced relation to its initial position during the period of engagement.

In the accompanying drawings Figure 1 is a perspective view, partly in section, Fig. 2 a longitudinal section and Fig. 3 an end elevation partly in section illustrating by way of example one form of power transmitter embodying the invention.

Referring to the drawings, 1 denotes the driving member or pulley which is mounted to rotate with the driving shaft 2 and embraces the driven member 3. The driving member 1 is shown as being provided with an internal annular friction surface 4. The boss 5 of the driven member 3 is mounted on an angularly adjustable cylindrical bush 6 the surface of the bore of which is eccentric to its external periphery, said bush 6 being sleeved on a stationary member of opposite eccentricity, *e. g.*, a second bush 7 mounted on, or integral with, a supporting tube 8 carried by an adjustable hanger 9 and extending into the boss of the driving member 1.

When the power transmitter is inoperative, *i. e.*, when the driven member 3 is at rest, the driving member 1 rotates around an axis coincident or nearly coincident with that of the driven member 3. To effect frictional engagement of the driving and driven members, the bush 6 is rocked, whereby the axis of the driven member 3 is shifted to assume an eccentric position parallel to that of the driving member 1, the driven member 3 being now rotated around a practically rigid axis which is not sensitive to any variation in the frictional surface.

It will be understood that with the arrangement described the driving shaft 2 is not subject to cross strains since the shaft 2 is sustained by each of the several driving pulleys 1 for the various machines in a battery which pulleys are journaled on supporting tubes 8 carried by the hangers 9. When a driven pulley 3 is shifted by the eccentric bush 6 into frictional engagement with a driving pulley 1 the outward thrust thereupon is resisted by the supporting tube 8 thereby relieving shaft 2 from any shearing action. In addition the entire device may be lubricated from a single point, the lubricant being conducted through the interior of the tube 8 and through passages 10 and 11 in the bushes 6 and 7 which are brought into register when the driven member 3 is in engagement with the driving member 1.

In lieu of the arrangement of the stationary bush 7 mounted on the tube 8, there may be employed any other suitable construction consisting of a rigidly supported cylindrical sustaining surface, eccentric to the axis of the driving pulley.

The bush 6 may be rocked against the action of a spring 12 in the direction to effect engagement of the driving and driven members by means of a connection 13 with a treadle (not shown); on the return movement of the bush 6 the boss 5 of the driven member is forced into contact with a stationary brake 14 forming part of the hanger.

While the invention is above described as applied to a sewing machine power bench, it is to be understood that a like arrangement may be applied to counter-shafts or to gears, gear boxes or geared connections generally in respect of which it is desirable for any purpose to throw into or out of operation a train of wheels.

What I claim is:—

1. The combination with a driving and a driven pulley the rim of one of which embraces the rim of the other, of an eccentric bearing bush for said driven pulley, and a tubular member having an outer surface eccentric to the axis of said driving pulley, said member sustaining externally said bush, said bush and said member being angularly movable relatively to one another to effect and interrupt the frictional engagement of the rims of said driving and driven pulleys.

2. The combination with a driving and a driven pulley the rim of one of which embraces the rim of the other, of an angularly adjustable bearing bush for said driven pulley, and a member having a convex outer surface eccentric to the axis of the driving pulley, said member sustaining said bush eccentrically, said bush and said member formed with lubricant passages adapted to be brought into communication on angular adjustment of said bush.

3. In a power transmitter, the combination with a driving shaft and a driving member fixed on said shaft, of a driven member adapted to engage said driving member, a tube encircling said shaft, an eccentric bearing bush for said driven member, a member sustaining said bush and sustained by said tube eccentrically of said shaft, and means for effecting relative angular displacement of said bush and said sustaining member, whereby to effect engagement of said driving and driven members.

4. In a power transmitter, the combination with a driving shaft and a driving member fixed upon said shaft, of a driven member adapted to engage said driving member, an adjustably mounted hanger, a tube encircling said shaft, said tube supported by said hanger, an eccentric bearing bush for said driven member, and a member on said tube sustaining said bush eccentrically of said shaft, said bush being angularly movable in relation to said sustaining member so as to bring said driven member into engagement with said driving member.

5. In a power transmitter, the combination with a driving shaft and a driving member carried thereby, of a driven member adapted to engage said driving member, a tube encircling said shaft, an eccentric bearing bush for said driven member, a member on said tube sustaining said bush eccentrically of said shaft, a braking device, and means for effecting relative angular displacement of said bush and said sustaining member to effect engagement and disengagement of said driving and driven members, and to effect application and release of said braking device.

6. In a power transmitter, the combination with a driving shaft and a driving member fixed thereto, of a driven member adapted to be engaged with said driving member, a hanger, means carried by the hanger surrounding said shaft loosely but supporting said shaft through said driving member, said means also supporting an eccentric member, an eccentric bearing bush supported by said eccentric member, and means for effecting relative angular adjustment of said bush and said eccentric member whereby to effect engagement of said driving and driven members.

7. In a power transmitter, the combination with a driving shaft and a driving pulley affixed thereto, of a driven pulley, an eccentric bearing bush for said driven pulley surrounding said shaft, a member having a cylindrical surface sustaining said bush and also eccentric to the axis of said driving shaft, said member surrounding said shaft, and means for supporting said member, said member and said bush being angularly movable relatively to one another for effecting engagement and disengagement of said driven and driving pulleys.

In testimony whereof I have signed my name to this specification in the presence of two subscribing witnesses.

HERBERT CORRALL.

Witnesses:
WALLACE CRANSTON FAIRWEATHER,
HENRY MASON.